(12) United States Patent
Abedini et al.

(10) Patent No.: US 11,683,209 B2
(45) Date of Patent: Jun. 20, 2023

(54) METHODS AND APPARATUS FOR SIGNALING GUARD SYMBOLS IN INTEGRATED ACCESS AND BACKHAULING

(71) Applicant: QUALCOMM Incorporated, San Diego, CA (US)

(72) Inventors: Navid Abedini, Basking Ridge, NJ (US); Jianghong Luo, Skillman, NJ (US); Luca Blessent, Whitehouse Station, NJ (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/223,915

(22) Filed: Apr. 6, 2021

(65) Prior Publication Data

US 2021/0367819 A1 Nov. 25, 2021

Related U.S. Application Data

(60) Provisional application No. 63/028,827, filed on May 22, 2020.

(51) Int. Cl.
| | | |
|---|---|---|
| H04L 27/26 | (2006.01) | |
| H04W 76/11 | (2018.01) | |
| H04W 88/14 | (2009.01) | |
| H04W 80/02 | (2009.01) | |

(52) U.S. Cl.
CPC ......... *H04L 27/2607* (2013.01); *H04W 76/11* (2018.02); *H04W 80/02* (2013.01); *H04W 88/14* (2013.01)

(58) Field of Classification Search
CPC ... H04L 27/2607; H04W 76/11; H04W 80/02; H04W 88/14; H04B 7/15528
See application file for complete search history.

(56) References Cited

U.S. PATENT DOCUMENTS

| | | | |
|---|---|---|---|
| 2020/0059879 A1 | 2/2020 | Nam et al. | |
| 2022/0131729 A1* | 4/2022 | You | H04L 5/0092 |

OTHER PUBLICATIONS

Huawei, HiSilicon, TP for Guard Symbols MAC CEs, 3GPP TSG-RAN WG2 Meeting #109 electronic, Feb. 24-Mar. 6, 2020, R2-2000528 (Year: 2020).*

(Continued)

*Primary Examiner* — Shailendra Kumar

(57) ABSTRACT

Aspects of the present disclosure include methods, apparatuses, and computer readable media for receiving a medium access control (MAC) control element (CE) comprising at least a set of guard symbol values associated with a mobile termination (MT) and a distributed unit (DU), transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values; and transmitting or receiving information via the transitioned one or more MT cells or the transitioned one or more DU cells.

30 Claims, 6 Drawing Sheets

(56) References Cited

OTHER PUBLICATIONS

WI Rapporteur (Qualcomm Incorporated), Upper layers parameters to support IAB physical layer operation, 3GPP TSG RAN WG1 Meeting #98bis, Chongqing, China, Oct. 14-Oct. 20, 2019, R1-1911724 (Year: 2019).*
Huawei, Reply LS on Guard Symbols in IAB, 3GPP TSG RAN WG1 #101-e, E-Meeting, May 25-Jun. 5, 2020, R1-2004618 (Year: 2020).*
Huawei, et al., "Discussion on Guard Symbols in IAB", 3GPP Draft, 3GPP TSG RAN WG1 Meeting #101-e, R1-2004619, 3rd Generation Partnership Project (3GPP), Mobile Competence Centre, 650, Route Des Lucioles, F-06921, Sophia-Antipolis Cedex, France, vol. RAN WG1, No. E-meeting, May 25, 2020-Jun. 5, 2020, May 16, 2020 (May 16, 2020), XP051886335, 2 pages, Retrieved from the Internet: URL: https://ftp.3gpp.org/tsg_ran/WG1_RL1/TSGR1_101-e/Docs/R1-2004619.zip R1-2004619.docx [retrieved on May 16, 2020], the whole document.
Huawei, et al., "TP for Guard Symbols MAC CEs," 3GPP Draft, 3GPP TSG-RAN WG2 Meeting # 109 electronic, R2-2000528, 3rd Generation Partnership Project (3GPP), Mobile Competence Centre, 650, Route Des Lucioles, F-06921, Sophia-Antipolis Cedex, France, vol. RAN WG2, No. Feb. 24, 2020-Mar. 6, 2020, Feb. 14, 2020 (Feb. 14, 2020), XP051849109, 8 pages, Retrieved from the Internet: URL: https://ftp.3gpp.org/tsg_ran/WG2_RL2/TSGR2_109_e/Docs/R2-2000528.zip R2-2000528 TP for Guard Sytnblos MAC CEs.docx [retrieved on Feb. 14, 2020], paragraphs [0002], [5.18.xx], [0006].
Huawei [RAN WG1]: "[Draft] Reply LS on Guard Symbols in IAB," 3GPP Draft, 3GPP TSG RAN WG1 #101-e, R1-2004618, 3rd Generation Partnership Project (3GPP), Mobile Competence Centre, 650, Route Des Lucioles, F-06921, Sophia-Antipolis Cedex, France, vol. RAN WG1, No. E-Meeting, May 25, 2020-Jun. 5, 2020, May 16, 2020 (May 16, 2020), XP051886334, 1 page, Retrieved from the Internet: URL: https://ftp.3gpp.org/tsg_ran/WG1_RL1/TSGR1_101-e/Docs/R1-2004618.zip R1-2004618.doc [retrieved on May 16, 2020] paragraph [0001].
International Search Report and Written Opinion—PCT/US2021/026206—ISA/EPO—dated Jul. 16, 2021.
WI Rapporteur (Qualcomm): "Upper Layers Parameters to Support IAB Physical Layer Operation", 3GPP Draft, 3GPP TSG RAN WG1 Meeting #98bis, R1-1911724—Upper Layers Parameters to Support IAB Physical Layer Operation, 3rd Generation Partnership Project (3GPP), Mobile Competence Centre, 650, Route Des Lucioles, F-06921 Sophia, vol. RAN WG1, No. Chongqing, China, Oct. 14, 2019-Oct. 20, 2019, Oct. 30, 2019 (Oct. 30, 2019), XP051814821, 11 pages, Retrieved from the Internet: URL: https://ftp.3gpp.org/tsg_ran/WG1_RL1/TSGR1_98b/Docs/R1-1911724.zip. R1-1911724-Upper Layers Parameters to Support IAB Physical Layer Operation. docx [retrieved on Oct. 30, 2019] p. 5-p. 10.

* cited by examiner

METHODS AND APPARATUS FOR SIGNALING GUARD SYMBOLS IN INTEGRATED ACCESS AND BACKHAULING

CROSS-REFERENCE TO RELATED APPLICATIONS

The present application relates to U.S. Provisional Application No. 63/028,827 filed on May 22, 2020, entitled "Methods and Apparatus for Signaling Guard Symbols in Integrated Access and Backhauling," the contents of which are incorporated by reference in their entireties.

BACKGROUND

Aspects of the present disclosure relate generally to wireless communications, and more particularly, to apparatuses and methods for signaling guard symbols in integrated access and backhauling.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, an integrated access and backhauling (IAB) node may include one or more mobile terminations (MTs) and one or more distributed units (DUs). When the IAB node switches between uplink transmission/reception and downlink transmission/reception, a guard symbol may be allocated for the time to transition. However, the amount of time to transition from MTs to DUs may vary. Therefore, improvements are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by an integrated access and backhauling node for receiving a medium access control (MAC) control element (CE) comprising at least a set of guard symbol values associated with a mobile termination (MT) and a distributed unit (DU), transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmitting or receiving information via the transitioned one or more MT cells or the transitioned one or more DU cells.

Other aspects of the present disclosure include an integrated access and backhauling node having a memory comprising instructions, a transceiver, and one or more processors operatively coupled with the memory and the transceiver, the one or more processors configured to execute instructions in the memory to receive a medium access control (MAC) control element (CE) comprising at least a set of guard symbol values associated with a mobile termination (MT) and a distributed unit (DU), transition from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmit or receive information via the transitioned one or more MT cells or the transitioned one or more DU cells.

An aspect of the present disclosure includes an integrated access and backhauling node including means for receiving a medium access control (MAC) control element (CE) comprising at least a set of guard symbol values associated with a mobile termination (MT) and a distributed unit (DU), means for transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and means for transmitting or receiving information via the transitioned one or more MT cells or the transitioned one or more DU cells.

Some aspects of the present disclosure include non-transitory computer readable media having instructions stored therein that, when executed by one or more processors of an integrated access and backhauling node, cause the one or more processors to receive a medium access control (MAC) control element (CE) comprising at least a set of guard symbol values associated with a mobile termination (MT) and a distributed unit (DU), transition from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmit or receive information via the transitioned one or more MT cells or the transitioned one or more DU cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
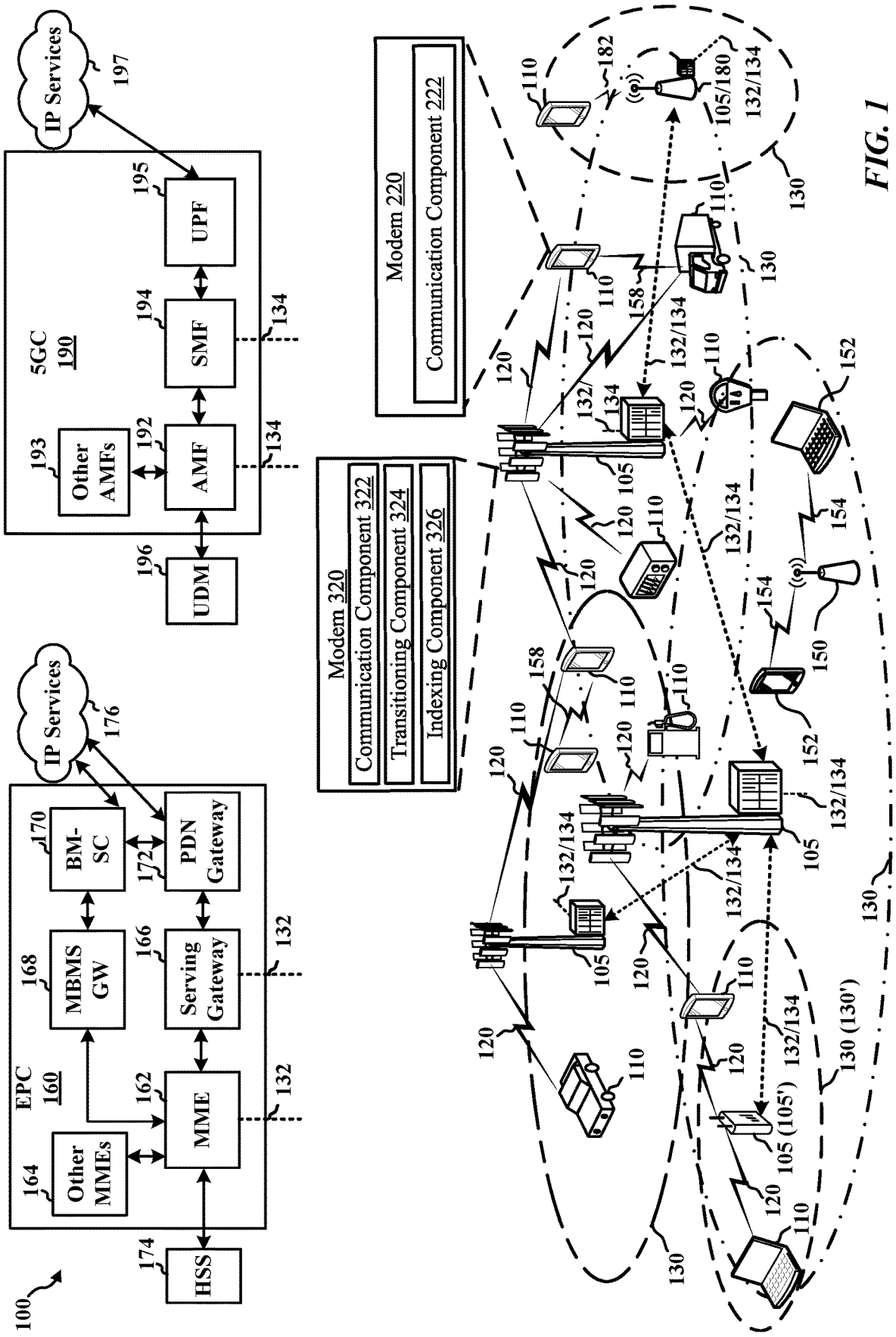
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, an intermediate integrated access and backhauling (IAB) node may communicate with a parent IAB node via the intermediate mobile termination (MT). The intermediate IAB node may communicate with a child IAB node via an intermediate distributed unit (DU). However, in some instances, the transition from communicating with the parent IAB node (e.g., transmitting uplink (UL) information or receiving downlink (DL) information) to communicating with the child IAB node (e.g., transmitting DL information or receiving UL information) may require some time (e.g., due to hardware switching). During this transition, the child IAB node may not be able to properly transmit and/or receive information. Therefore, one or more guard symbols may be inserted into the first and/or last slot communicated to the intermediate IAB node.

In some implementations, the intermediate IAB node may request a desired guard symbol(s). The parent IAB node may respond with a provided guard symbol(s).

In some aspects of the present disclosure, the one or more guard symbols may vary in lengths. The parent IAB node may signal different guard symbol values to the intermediate IAB node to indicate the lengths of the guard symbols for transmission/reception via the MT and/or DU. The parent IAB node may signal the guard symbol values via one or more medium access control (MAC) control elements (CEs) and/or one or more radio resource control (RRC) messages.

In certain aspects, an IAB node may be implemented by a base station (BS). The IAB node may communicate with other IAB nodes and/or one or more user equipment (UE). In some implementations, a BS may implement more than one IAB node.

In an implementation, an IAB node may include one or more MTs and/or one or more DUs.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. The BS 105 may include a transitioning component 324 that transitions from one cell to another. The BS 105 may include an indexing component 326 that indexes cells in a network. In some implementations, the communication component 322, the transitioning component 324, and/or the indexing component 326 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
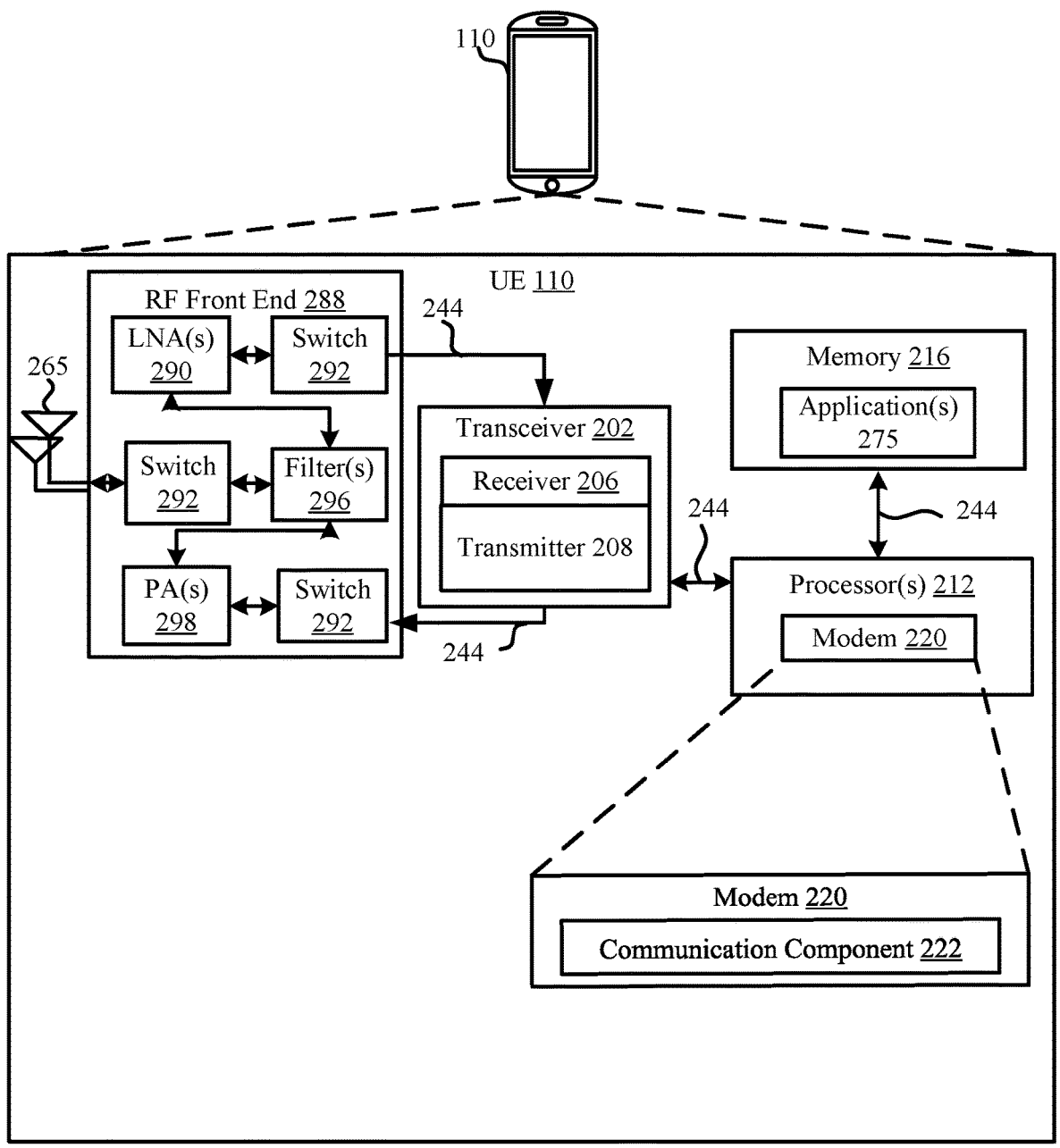
FIG. 2 is a schematic diagram of an example of a user equipment.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
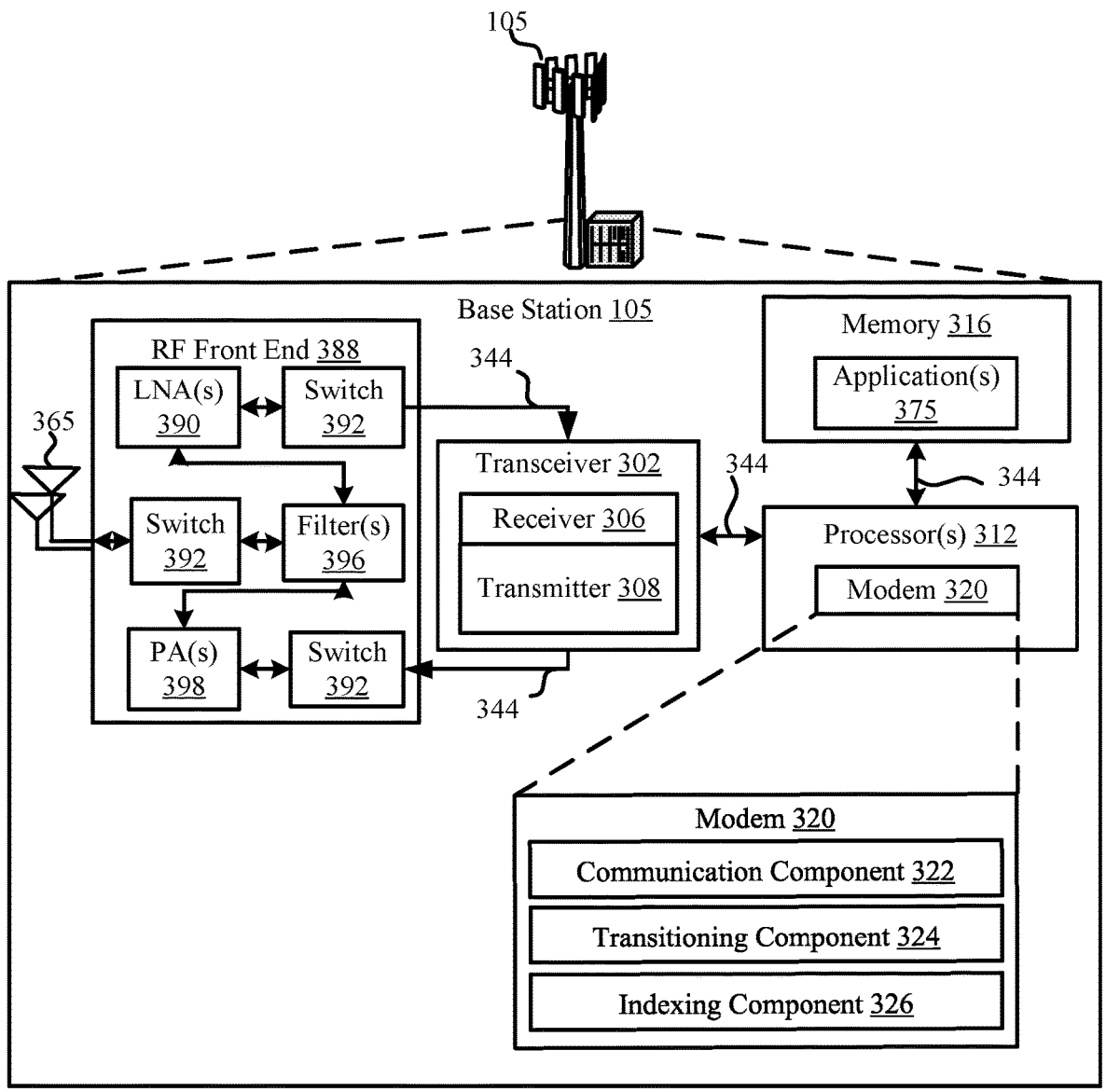
FIG. 3 is a schematic diagram of an example of a base station.

Referring to FIG. 3, one example of an implementation of the BS 105 may include a modem 320 having the communication component 322, the transitioning component 324, and/or the indexing component 326. In some implementations, the BS 105 may include a communication component 322 configured to communicate with the UE 110. The BS 105 may include a transitioning component 324 that transitions from one cell to another. The BS 105 may include an indexing component 326 that indexes cells in a network.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322, the transitioning component 324, and/or the indexing component 326 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, the transitioning component 324, and/or the indexing component 326, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the transitioning component 324, and/or the indexing component 326, and/or one or more of the subcomponents, and/or data associated therewith, when the BS 105 is operating at least one processor 312 to execute the communication component 322, the transitioning component 324, and/or the indexing component 326, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
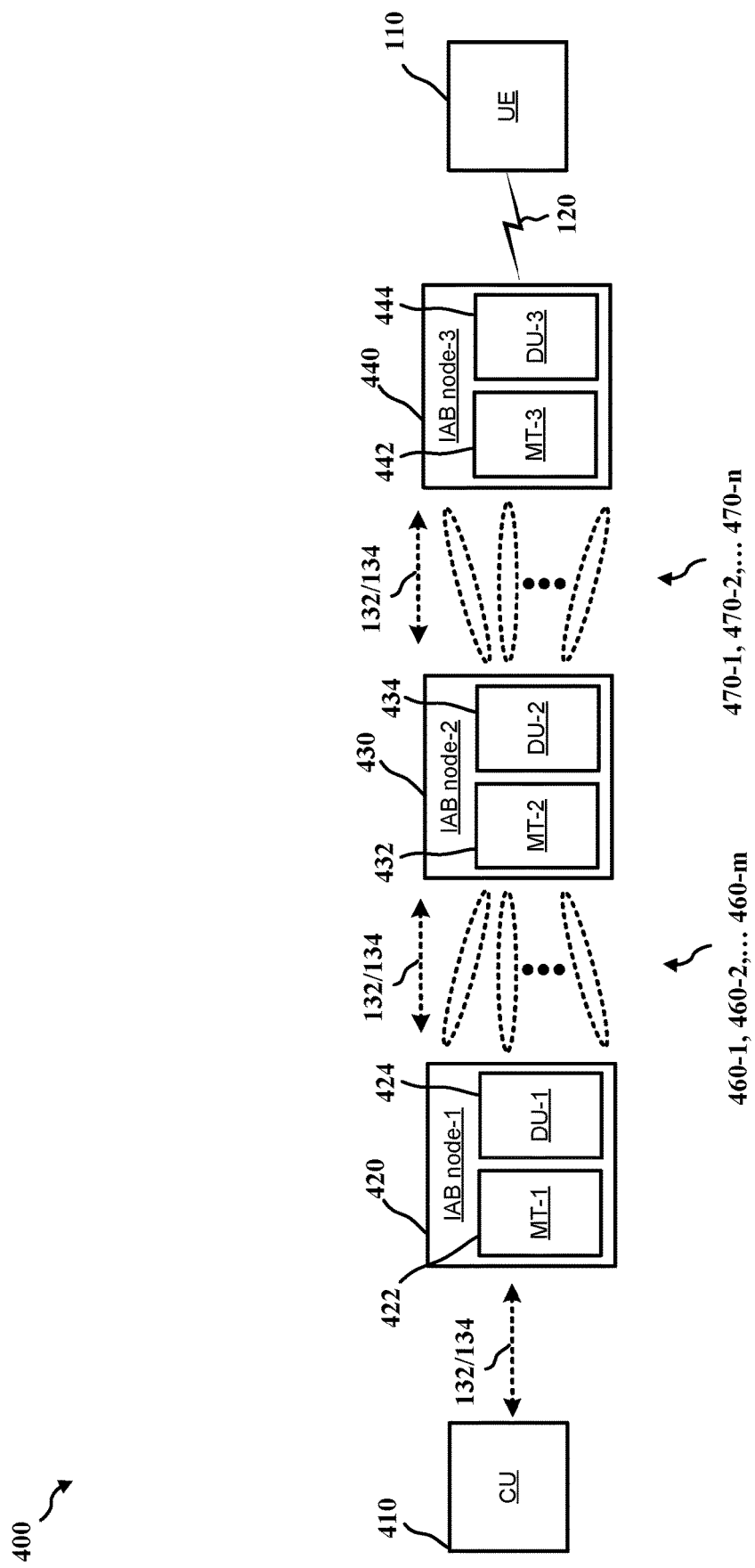
FIG. 4 illustrates an example of an environment for signaling guard symbol values in a network implementing integrated access and backhauling according to aspects of the present disclosure.

FIG. 4 illustrates an example of an environment for signaling guard symbol values in a network implementing integrated access and backhauling. In some implementations, an environment 400 may include a central unit 410. The environment 400 may include IAB node-1 420 having MT-1 422 and DU-1 424, IAB node-2 430 having MT-2 432 and DU-2 434, and IAB node-3 440 having MT-3 442 and DU-3 444. The environment 400 may include additional IAB nodes. The environment 400 may include a user equipment (UE) 110. The IAB nodes 420, 430, 440 may be implemented as the BS 105, the gNB 180, the Wi-Fi STA 152 or other transmission/reception points. The IAB nodes 420, 430, 440, may communicate with each other via the backhaul links 132, 134. The IAB node-3 440 may communicate with the UE 110 via the wireless communication links 120.

In some aspects of the present disclosure, the IAB node-1 420 may be a parent IAB node, the IAB node-2 430 may be an intermediate IAB node, and the IAB node-3 440 may be a child IAB node. The IAB node-2 430 may communicate (e.g., transmission (TX) or reception (RX)) with the IAB node-1 420 via one or more MT cells 460-1, 460-2, 460-3 . . . 460-*m* (where m is a positive integer) associated with the MT-2 432. The IAB node-2 430 may communicate (e.g., TX or RX) with the IAB node-3 440 via one or more DU cells 470-1, 470-2, 470-3 . . . 470-*n* (where n is a positive integer) associated with the DU-2 434. During a transition between the MT-2 432 (or the one or more MT cells 460) and the DU-2 434 (or the one or more DU cells 470), a certain amount of guard symbols (of the last slot transmitted and/or received by the MT-2 432 and/or DU-2 434 before the transition or the first slot transmitted and/or received by the MT-2 432 and/or DU-2 434 after the transition) may be allocated to allow the transition to occur, during which the IAB node-2 430 may be unable to transmit or receive data. In some implementations, up to eight different transitions may occur for each pair of MT cell and DU cell between the MT-2 432 and the DU-2 434: MT-2 TX to DU-2 TX, MT-2 TX to DU-2 RX, MT-2 RX to DU-2 TX, MT-2 RX to DU-2 RX, DU-2 TX to MU-2 TX, DU-2 TX to MU-2 RX, DU-2 RX to MU-2 TX, and DU-2 RX to MU-2 RX. The eight different transitions may include the same or different guard symbols. The number of guard symbols for the transitions may be signaled by the IAB node-1 420 to the IAB node-2 430. In one instance, the IAB node-1 420 may rely on one or more medium access control (MAC) control elements (CEs) and/or radio resource control (RRC) messages to signal the number of guard symbols for the transitions.

In a first example, the IAB node-1 420 may transmit a MAC CE to the IAB node-2 430. The MAC CE may include eight numbers (e.g., 3 bits each) associated with the number of guard symbols for the eight transitions (described above) for a pair of MT cell and DU cell between the MU-2 432 and the DU-2 434. The eight numbers may indicate the amount of time the IAB node-2 432 has to perform the transitions. For example, the MAC CE may include 001, 001, 001, 001, 001, 001, 001, and 001 indicating that during any of the eight transitions between the MT cell 460-2 of the MU-2 432 and the DU cell 470-1 of the DU-2 434, the IAB node-2 430 has a time equivalent to one guard symbol to perform the transition.

For example, the IAB node-2 430 may be transitioning from receiving DL information via the MT cell 460-2 of the MT-2 432 to transmitting DL information via the DU cell 470-1 of the DU-2 434. One guard symbol may be inserted into the end of the slot received by the MT-2 432 immediately prior to the transition. During the guard symbol, the IAB node-2 430 may transition from receiving DL information via the MT-2 432 to transmitting DL information via the DU-2 434. After the transition, the DU-2 434 may transmit DL information.

In one aspect of the present disclosure, the MAC CE may include an MT identification (ID) associated with the MT cell 460-2 of the MT-2 432 and a DU ID associated with the DU cell 470-1 of the DU-2 434. Based on the MT ID and the DU ID, the IAB node-1 420 may indicate to the IAB node-2 430 that the eight numbers associated with the number of guard symbols for the eight transitions in the MAC CE are associated with the MT-2 432 and DU-2 434.

In another aspect of the present disclosure, the eight numbers may be associated with the number of guard symbols for the eight transitions between another pair of MT cell and DU cell, such as the MT cell 460-1 and the DU cell 470-*n*.

In certain aspects of the present disclosure, the MAC CE may include one or more MT IDs associated with some or all of the one or more MT cells 460 and one or more DU IDs associated with some or all of the one or more DU cells 470.

In yet another aspect, the eight numbers may be associated with the number of guard symbols for the eight transitions for one MT cell and some of all of the DU cells 470 (e.g., DU cells 470-1, 470-3, 470-4, 470-*n*).

In one aspect, the eight numbers may be associated with the number of guard symbols for the eight transitions for some of all of the MT cells 460 (e.g., DU cells 460-2, 460-3, 460-5, 460-*m*) and one DU cell.

In a second example, the IAB node-1 420 may transmit a MAC CE to the IAB node-2 430. The MAC CE may include eight numbers (e.g., 3 bits each) associated with the number of guard symbols for the eight transitions (described above) between the MU-2 432 (or the one or more MT cells 460) and the DU-2 434 (or the one or more DU cells 470). The eight numbers may indicate the amount of time the IAB node-2 432 has to perform the transitions. For example, the MAC CE may include the numbers 010, 011, 101, 000, 111, 001, 001, and 001 indicating the numbers of guard symbols for the eight transitions between a cell of the MU-2 432 and a cell of the DU-2 434.

For example, the IAB node-2 430 may be transitioning from transmitting UL information via the MT cell 460-3 of the MT-2 432 to transmitting DL information via the DU cell 470-2 of the DU-2 434. Two guard symbols ("010") may be inserted into the end of the slot received by the MT-2 432 immediately prior to the transition. During the guard symbols, the IAB node-2 430 may transition from transmitting UL information via the MT-2 432 to transmitting DL information via the DU-2 434. After the transition, the DU-2 434 may transmit DL information.

In some aspects of the present disclosure, prior to transmitting the MAC CE, the IAB node-1 420 may index the MT cells 460-1, 460-2 . . . 460-*m* with alphanumeric characters different from the MT IDs of the MTs 422, 432, 442 in the environment 400. The IAB node-1 420 may index the DU cells 470-1, 470-2 . . . 470-*n* with alphanumeric characters different from the DU IDs of the DUs 424, 434, 444. For example, the IAB node-1 420 may assign indices of 1, 0, 4, 2, and 3 to the MT cells 460-1, 460-2 . . . 460-5, respectively. The IAB node-1 420 may assign indices of e, b, c, d, a, f to DU cells 470-1, 470-2 . . . 470-6, respectively. The assignment of the indices may depend on a sorted list of MT and/or DU IDs, geographic locations, cell sizes, cell types, timing advance groups, or other criteria.

In one aspect of the present disclosure, the IAB node-1 420 may transmit, in a RRC message to the IAB node-2 430, the indices 0 and c to indicate the MT cell 460-2 of the MT-2 432 and the DU cell 470-3 of the DU-2 434, respectively. Based on the indices, the IAB node-1 420 may indicate to the IAB node-2 430 that the eight numbers associated with the number of guard symbols for the eight transitions in the MAC CE are associated with the MT cell 460-2 of the MT-2 432 and the DU cell 470-3 of the DU-2 434.

In a third example, the IAB node-1 420 may transmit a MAC CE to the IAB node-2 430. The MAC CE may include eight numbers (e.g., 3 bits each) associated with the number of guard symbols for the eight transitions (described above) for each pair of MT cell and DU cell in the environment 400. For example, the MT-2 432 may communicate via 2 cells (MT cells 460-1, 460-2) and the DU-2 434 may communicate via 3 cells (DU cells 470-1, 470-2, 470-3). The MAC CE may include six sets of eight numbers each indicating the numbers of guard symbols for the eight transitions between the six pairs of MT cells and DU cells: MT cell 460-1 and DU cell 470-1, MT cell 460-1 and DU cell 470-2, MT cell 460-1 and DU cell 470-3, MT cell 460-2 and DU cell 470-1, MT cell 460-2 and DU cell 470-2, and MT cell 460-2 and DU cell 470-3. The first 24 bits (8 transitions multiplied by 3 bits representing the symbols for each transition) may be associated with the MT cell 460-1 and DU cell 470-1, the second 24 bits may be associated with the MT cell 460-1 and DU cell 470-2, and so forth and so on.

In some aspects of the present disclosure, the IAB node-1420 may transmit a RRC message to the IAB node-2 430. The RRC message may include an indication to the bit locations associated with the pair of MT cell and DU cell (e.g., bits #25 to #48 for the MT cell 460-1 and DU cell 470-2 transitions) associated with the eight numbers. Based on the indices, the IAB node-1 420 may indicate to the IAB node-2 430 that the eight numbers (from bits #25 to #48) associated with the number of guard symbols for the eight transitions are associated with the MT cell 460-1 and DU cell 470-2.

In some aspects of the present disclosure, the RRC message may include indications to the bit locations associated with more than one pair of MT cells and DU cells.

In a fourth example, the IAB node-1 420 may transmit a MAC CE to the IAB node-2 430. The MAC CE may include eight numbers (e.g., 3 bits each) associated with the number of guard symbols for the eight transitions (described above) between the MU-2 432 (or the one or more MT cells 460) and the DU-2 434 (or the one or more DU cells 470). The eight numbers may indicate the amount of time the IAB node-2 432 has to perform the transitions.

In some aspects of the present disclosure, prior to transmitting the MAC CE, the IAB node-1 420 may index the pairs of the MT cells 460 and the DU cells 470 with alphanumeric characters. For example, the MT-2 432 may communicate via 3 cells (MT cells 460-1, 460-2, 460-3) and the DU-2 434 may communicate via 2 cells (DU cells 470-1, 470-2). The IAB node-1 420 may assign indices of 4, 2, 0, 1, 5, 3 to the six pairs of MT cells and DU cells: MT cell 460-1 and DU cell 470-1, MT cell 460-1 and DU cell 470-2, MT cell 460-2 and DU cell 470-1, MT cell 460-2 and DU cell 470-2, MT cell 460-3 and DU cell 470-1, and MT cell 460-3 and DU cell 470-2, respectively. The assignment of the indices may depend on a sorted list of MT and/or DU IDs, geographic locations, cell sizes, cell types, timing advance groups, or other criteria. The index list may include the indices associated with the six pairs of MT cells and DU cells. In an implementation, the MAC CE may include $m \times (24 + \log_2(\text{index list length}))$ bits.

In an aspect, the IAB node-1 420 may transmit, via a RRC message, the list of indices for the six pairs of MTs and DUs to the IAB nod-2 430. The IAB node-1 420 may transmit, in the MAC CE with the eight numbers associated with the number of guard symbols for the eight transitions, the index 4 to indicate to the IAB node-2 430 that the eight numbers are associated with the pair MT cell 460-1 and DU cell 470-1.

In a fifth example, the IAB node-1 420 may transmit a MAC CE to the IAB node-2 430. The MAC CE may include eight numbers (e.g., 3 bits each) associated with the number of guard symbols for the eight transitions (described above) between a MT cell of the one or more MT cells 460 of the MU-2 432 and some or all of the one or more DU cells 470 of the DU-2 434. For example, the JAB node-1 420 may transmit the MAC CE to the JAB node-2 430. The MAC CE may include indications, based on the MT IDs and DU IDs or indices as described above, indicating that the eight numbers associated with the number of guard symbols may be associated with the transitions between the MT cell 460-4 of the MT-2 432 and the DU cells 470-1, 470-2, 470-4 of the DU-2 434.

In a sixth example, the JAB node-1 420 may transmit a MAC CE to the JAB node-2 430 via a MT cell of the one or more MT cells 460. The MAC CE may include eight numbers (e.g., 3 bits each) associated with the number of guard symbols for the eight transitions (described above) between the MT cell of the one or more MT cells 460 of the MU-2 432 and the DU cells 470 of the DU-2 434. The MT cell may belong to one or more of a timing advance group (TAG), a master cell group (MCG), and/or a secondary cell group (SCG). The JAB node-2 430, upon receiving the MAC CE, may associate the eight numbers with some or other MT cells in the one or more of the TAG, MCG, and/or SCG.

For example, the JAB node-1 420 may transmit the MAC CE (having the eight numbers associated with the number of guard symbols for the eight transitions) via the MT cell 460-5. The MT cell 460-5 may be part of a TAG that shares the same timing advance (TA) value as other cells of the group. Other cells include MT cells 460-1, 460-3, and 460-*m*. As a result, the JAB node-2 430, upon receiving the MAC CE via the MT cell 460-5, may associate the eight numbers with the number of guard symbols allocated for the transitions between MT cells 460-1, 460-3, 460-*m* and the DU cells 470.

In a seventh example, the IAB node-1 420 may transmit a MAC CE to the JAB node-2 430 including a DU group index identifying a DU cell group. The MAC CE may include eight numbers (e.g., 3 bits each) associated with the number of guard symbols for the eight transitions (described above) between a MT cell of the one or more MT cells 460 of the MU-2 432 and the DU cells in the DU cell group.

For example, the MAC CE may include an index of 2 identifying a DU cell group including the DU cells 470-2, 470-3, 470-4. Upon receiving the MAC CE, the JAB node-2 430 may associate the eight numbers associated with the number of guard symbols for the transitions between a MT cell, e.g., the MT cell 460-1, and the DU cells 470-2, 470-3, 470-4.

In an eight example, the JAB node-1 420 may transmit a MAC CE to the JAB node-2 430 include one or more flags indicating the eight numbers (e.g., 3 bits each) associated with the number of guard symbols for the eight transitions (described above) is associated with at least two of a pair of MT cell and DU cell, a MT cell group, a TAG, a MCG, a SCG, or a DU cell group.

For example, the MAC CE may include the eight numbers and a two-bit flag having values 00, 01, 10, and 11. Flag values of 00, 01, 10, and 11 may indicate that the eight numbers are associated with a pair of MT cell and DU cell, a MT cell group, a DU cell group, and a MT cell and a DU cell group, respectively.

In some implementations, the JAB node-1 420 and/or the JAB node-2 430 may signal to the JAB node-3 440 guard symbol information.

In a ninth example, the JAB node-2 430 may sent one or more signals to the JAB node-1 420 to indicate the grouping of the DU cells 470. For example, the JAB node-2 430 may transmit a RRC message, a F1 interface application protocol (F1-AP) message, and/or a MAC CE to the JAB node-1 420 indicating the grouping of the DU cells 470 associated with the DU-2 434.

In a tenth example, the JAB node-1 420 may transmit a signal to the JAB node-2 430 including eight numbers (e.g., 3 bits each) associated with the number of guard symbols for the eight transitions (described above) for a group of pairs of MT cells and DU cells. The signal may indicate that the guard symbols do not apply to some of the pairs of MT cells and DU cells. For example, the IAB node-1 420 may transmit a MAC CE to the JAB node-2 430. The MAC CE may include the eight numbers associated with the guard symbols for all MT cells 460 and all DU cells 470. The JAB node-1 420 may transmit, in the MAC CE or other signals, that the guard symbols do not apply to the pair of the MT cell 460-2 and DU cell 470-1. This may be due to the difference in multiplexing capabilities among the cells.

In yet another example, it may be implicitly determined (by the IAB node-1 420 or the IAB node-2 430) whether the indicated guard symbols are applicable to a pair of MT cell and DU cell, or not. This determination may be based on prior signaling indicating the multiplexing capabilities among the two cells. For example, in case it was indicated that a first communication of an MT cell and a second communication of a DU cell can be multiplexed on overlapping time resources (i.e. no need to allocate non-overlapping time resources to these two communication), then the guard symbols may not apply to this pair of MT cell and DU cell.

In some implementations, the indicated multiplexing capability may be indicating that one or more of the following simultaneous communications are supported: MT cell TX, and DU cell TX, MT cell TX and DU cell RX, MT cell RX and DU cell RX, MT cell RX and DU cell TX, or alternatively MT cell communications (TX and/or RX) may be time-domain multiplexed (TDMed) with DU cell communications (TX and/or RX). Other types of simultaneous communications may also be supported.

Based on the indicated multiplexing cases supported by the IAB-node, it may be determined which type(s) of guard symbols are not applicable to the pair of MT cell and DU cell. For example, if simultaneous MT cell TX and DU cell RX is supported, then no guard symbol would be required when there is a transition from MT sending UL (i.e. MT cell TX) to DU receiving UL (i.e. DU cell RX).

Figure 5:
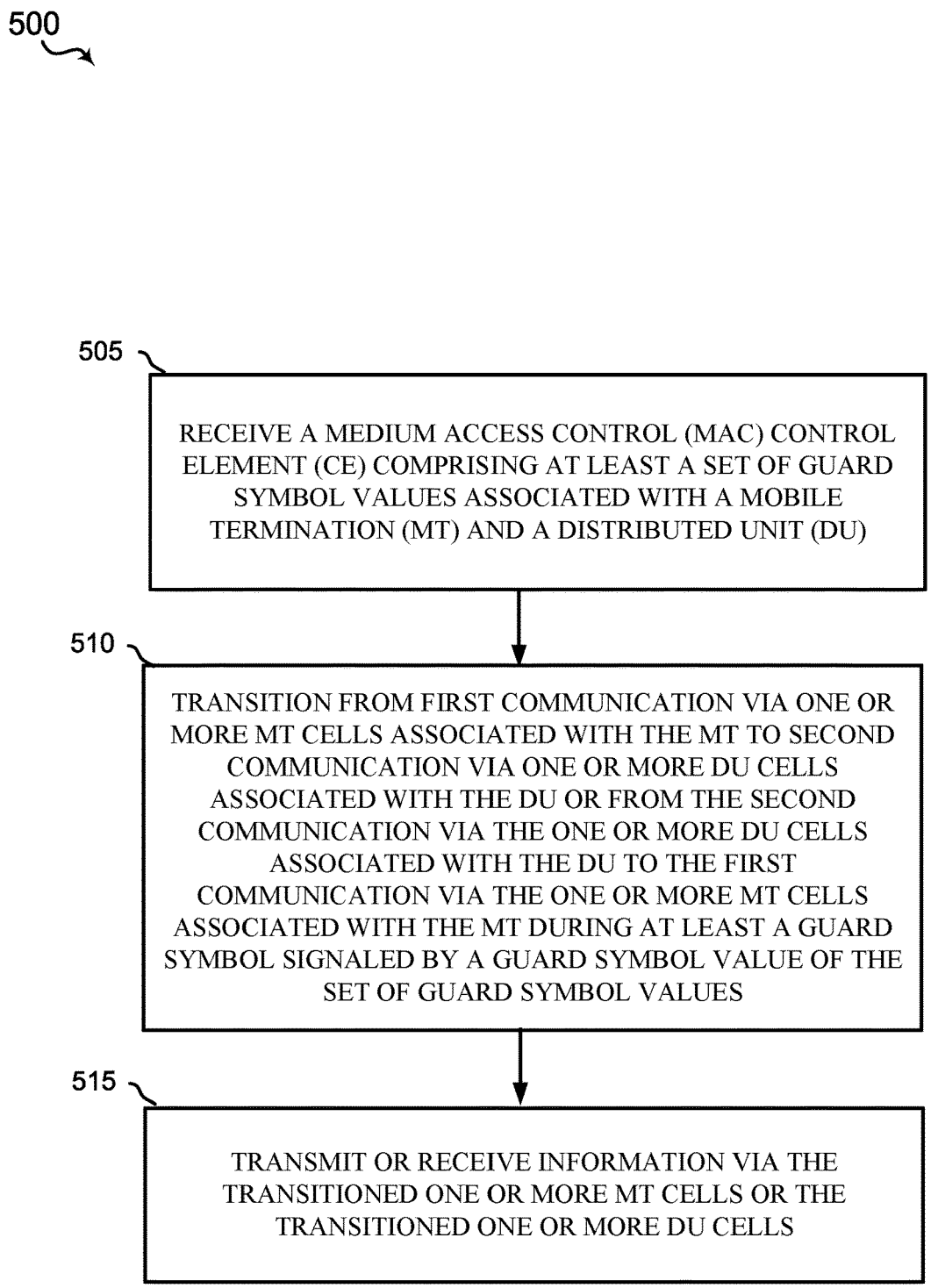
FIG. 5 illustrates an example of a method for receiving guard symbol values by an IAB according to aspects of the present disclosure.

FIG. 5 illustrates an example of a method for receiving guard symbol values by an IAB. For example, a method 500 may be performed by the one or more of the processor 312, the memory 316, the applications 375, the modem 320, the transceiver 302, the receiver 306, the transmitter 308, the RF front end 388, the communication component 322, the transitioning component 324, and/or the indexing component 326, and/or one or more other components of an IAB, such as the BS 105 in the wireless communication network 100.

At block 505, the method 500 may receive a medium access control (MAC) control element (CE) comprising at least a set of guard symbol values associated with a mobile termination (MT) and a distributed unit (DU). For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive a medium access control (MAC) control element (CE) comprising at least a set of guard symbol values associated with a mobile termination (MT) and a distributed unit (DU) as described above (e.g., first example under FIG. 4). The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving a medium access control (MAC) control element (CE) comprising at least a set of guard symbol values associated with a mobile termination (MT) and a distributed unit (DU).

At block 510, the method 500 may transition from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values. For example, the transitioning component 324 the processor 312, the memory 316, the modem 320, and/or the applications 375 of the BS 105 may receive a medium access control (MAC) control element (CE) comprising at least a set of guard symbol values associated with a mobile termination (MT) and a distributed unit (DU) as described above.

In certain implementations, the transitioning component 324 the processor 312, the memory 316, the modem 320, and/or the applications 375 may be configured to and/or may define means for transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values.

At block 515, the method 500 may transmit or receive information via the transitioned one or more MT cells or the transitioned one or more DU cells. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit or receive information via the transitioned one or more MT cells or the transitioned one or more DU cells. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting or receiving information via the transitioned one or more MT cells or the transitioned one or more DU cells.

Alternatively or additionally, the method 500 may further include any of the methods above, wherein the MAC CE comprises one or more MT identifications (ID) for the one or more MT cells associated with the MT and one or more DU IDs for the one or more DU cells associated with the DU.

Alternatively or additionally, the method 500 may further include any of the methods above, further comprising receiving a radio resource control (RRC) message comprising one or more MT indices identifying the one or more MT cells and one or more DU indices identifying the one or more DU cells, wherein the set of guard symbol values is associated with the one or more MT indices and the one or more DU indices.

Alternatively or additionally, the method 500 may further include any of the methods above, wherein the MAC-CE comprises a plurality of bits indicating a plurality of sets of guard symbol values associated with a plurality of pairs of MT cells and DU cells, and receiving a radio resource control (RRC) message indicating the association between bit positions of a subset of the plurality of bits associated with the set of guard symbol values and a pair of MT cell and DU cell of the plurality of pairs of MT cells and DU cells, and identifying, based on the bit positions, the set of guard symbol values of the plurality of sets of guard symbol values associated with the pair of MT cell and DU cell.

Alternatively or additionally, the method 500 may further include any of the methods above, wherein the set of guard symbol values is associated with a second pair of MT cell and DU cell, of the plurality of pairs of MT cells and DU cells, different from the pair of MT cell and DU cell.

Alternatively or additionally, the method 500 may further include any of the methods above, further comprising receiving a radio resource control (RRC) message comprising a plurality of indices each associated with a pair of MT cell and DU cell of a plurality of pairs of MT cell and DU cell, and wherein receiving the MAC CE comprises receiving one or more indices, of the plurality of indices, associated with the one or more pairs of MT cells and DU cells.

Alternatively or additionally, the method 500 may further include any of the methods above, wherein the set of guard symbol values is associated with an MT cell and a plurality of DU cells.

Alternatively or additionally, the method 500 may further include any of the methods above, wherein receiving the MAC CE comprises receiving the MAC CE from a cell associated with a timing advance group, a master cell group, or a secondary cell group, and the set of guard symbol values is associated with the timing advance group, the master cell group, or the secondary cell group.

Alternatively or additionally, the method 500 may further include any of the methods above, wherein receiving the MAC CE further comprises receiving a DU group index identifying a DU cell group.

Alternatively or additionally, the method 500 may further include any of the methods above, wherein receiving the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

Figure 6:
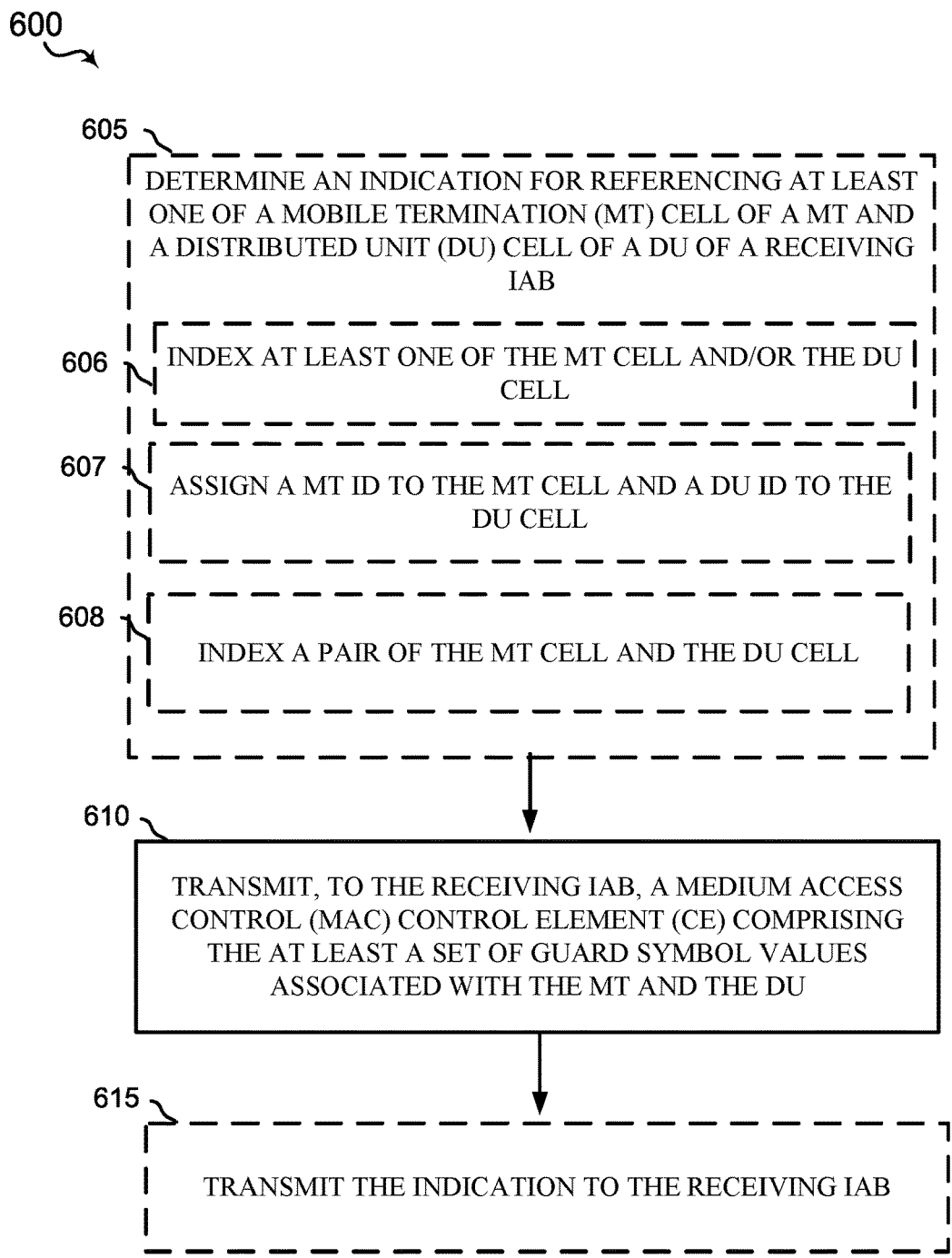
FIG. 6 illustrates an example of a method for transmitting guard symbol values to an IAB according to aspects of the present disclosure

FIG. 6 illustrates an example of a method for transmitting guard symbol values to an IAB. For example, a method 600 may be performed by the one or more of the processor 312, the memory 316, the applications 375, the modem 320, the transceiver 302, the receiver 306, the transmitter 308, the RF front end 388, the communication component 322, the transitioning component 324, and/or the indexing component 326, and/or one or more other components of the BS 105 in the wireless communication network 100.

At block 605, the method 600 may optionally determine an indication for referencing at least one of a mobile termination (MT) cell of a MT and a distributed unit (DU) cell of a DU of a receiving IAB. For example, the indexing component 326 may index (606) at least one of the MT cell and/or the DU cell as discussed above (e.g., first example under FIG. 4). In alternatively examples, the indexing component 326 may assign (607) a MT ID to the MT cell and a DU ID to the DU cell. In another example, the indexing component 326 may index (608) a pair of the MT cell and the DU cell.

In certain implementations, the indexing component 326, the processor 312, the memory 316, the modem 320, and/or the applications 375 may be configured to and/or may define means for determining an indication for referencing at least one of a mobile termination (MT) cell of a MT and a distributed unit (DU) cell of a DU of a receiving IAB.

At block 610, the method 600 may transmit, to the receiving IAB, a medium access control (MAC) control element (CE) comprising the at least a set of guard symbol values associated with the MT and the DU. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit a medium access control (MAC) control element (CE) comprising at least a set of guard symbol values associated with a mobile termination (MT) and a distributed unit (DU) as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to the receiving IAB, a medium access control (MAC) control element (CE) comprising at least a set of guard symbol values associated with a mobile termination (MT) and a distributed unit (DU).

At block 615, the method 600 may transmit the indication to the receiving IAB. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit the indication (via the MAC CE or a RRC message) to the receiving IAB. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting the indication to the receiving IAB.

Alternatively or additionally, the method 600 may further include any of the methods above, wherein the MAC CE comprises one or more MT identifications (ID) for one or more MT cells associated with the MT and one or more DU IDs for one or more DU cells associated with the DU.

Alternatively or additionally, the method 600 may further include any of the methods above, transmitting a radio resource control (RRC) message comprising one or more MT indices identifying one or more MT cells and one or more DU indices identifying one or more DU cells, wherein the set of guard symbol values is associated with the one or more MT indices and the one or more DU indices.

Alternatively or additionally, the method 600 may further include any of the methods above, wherein the MAC-CE comprises a plurality of bits indicating a plurality of sets of guard symbol values associated with a plurality of pairs of MT cells and DU cells, further comprising transmitting a radio resource control (RRC) message indicating the association between bit positions of a subset of the plurality of bits associated with the set of guard symbol values and a pair of MT cell and DU cell of the plurality of pairs of MT cells and DU cells.

Alternatively or additionally, the method 600 may further include any of the methods above, wherein the set of guard symbol values is associated with a second pair of MT cell and DU cell, of the plurality of pairs of MT cells and DU cells, different from the pair of MT cell and DU cell.

Alternatively or additionally, the method 600 may further include any of the methods above, further comprising a radio resource control (RRC) message comprising a plurality of indices each associated with a pair of MT cell and DU cell of a plurality of pairs of MT cell and DU cell wherein transmitting the MAC CE comprises transmitting one or more indices, of the plurality of indices, associated with the one or more pairs of MT cells and DU cells.

Alternatively or additionally, the method 600 may further include any of the methods above, wherein the set of guard symbol values is associated with an MT cell and a plurality of DU cells.

Alternatively or additionally, the method 600 may further include any of the methods above, wherein transmitting the MAC CE comprises transmitting the MAC CE from a cell associated with a timing advance group, a master cell group, or a secondary cell group and the set of guard symbol values is associated with the timing advance group, the master cell group, or the secondary cell group.

Alternatively or additionally, the method 600 may further include any of the methods above, wherein transmitting the MAC CE further comprises transmitting a DU group index identifying a DU cell group.

Alternatively or additionally, the method 600 may further include any of the methods above, wherein transmitting the MAC CE comprises transmitting a flag indicating whether the set of guard symbol values is associated with a pair of MT cell and DU cell of a plurality of pairs of MT cells and DU cells or one of a MT cell group, a timing advance group, or a DU cell group.

ADDITIONAL IMPLEMENTATIONS

Aspects of the present disclosure include methods by an integrated access and backhauling node for receiving a medium access control (MAC) control element (CE) comprising at least a set of guard symbol values associated with a mobile termination (MT) and a distributed unit (DU), transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmitting or receiving information via the transitioned one or more MT cells or the transitioned one or more DU cells.

Any of the methods above, wherein the MAC CE comprises one or more MT identifications (ID) for the one or more MT cells associated with the MT and one or more DU IDs for the one or more DU cells associated with the DU.

Any of the methods above, further comprising receiving a radio resource control (RRC) message comprising one or more MT indices identifying the one or more MT cells and one or more DU indices identifying the one or more DU cells, wherein the set of guard symbol values is associated with the one or more MT indices and the one or more DU indices.

Any of the methods above, wherein the MAC-CE comprises a plurality of bits indicating a plurality of sets of guard symbol values associated with a plurality of pairs of MT cells and DU cells, and receiving a radio resource control (RRC) message indicating the association between bit positions of a subset of the plurality of bits associated with the set of guard symbol values and a pair of MT cell and DU cell of the plurality of pairs of MT cells and DU cells, and identifying, based on the bit positions, the set of guard symbol values of the plurality of sets of guard symbol values associated with the pair of MT cell and DU cell.

Any of the methods above, wherein the set of guard symbol values is associated with a second pair of MT cell and DU cell, of the plurality of pairs of MT cells and DU cells, different from the pair of MT cell and DU cell.

Any of the methods above, further comprising receiving a radio resource control (RRC) message comprising a plurality of indices each associated with a pair of MT cell and DU cell of a plurality of pairs of MT cell and DU cell, and wherein receiving the MAC CE comprises receiving one or more indices, of the plurality of indices, associated with the one or more pairs of MT cells and DU cells.

Any of the methods above, wherein the set of guard symbol values is associated with an MT cell and a plurality of DU cells.

Any of the methods above, wherein receiving the MAC CE comprises receiving the MAC CE from a cell associated with a timing advance group, a master cell group, or a secondary cell group, and the set of guard symbol values is associated with the timing advance group, the master cell group, or the secondary cell group.

Any of the methods above, wherein receiving the MAC CE further comprises receiving a DU group index identifying a DU cell group.

Any of the methods above, wherein receiving the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

Any of the methods above, further comprising transmitting a radio resource control message, a F1 application protocol message, or a second MAC CE to indicate at least a grouping of the one or more DU cells.

Any of the methods above, further comprising receiving a signal indicating that the at least a set of guard symbol values is not applicable to a subset of a plurality of pairs of the one or more MT cells and the one or more DU cells.

Other aspects of the present disclosure include an integrated access and backhauling node having a memory comprising instructions, a transceiver, and one or more processors operatively coupled with the memory and the transceiver, the one or more processors configured to execute instructions in the memory to receive a medium access control (MAC) control element (CE) comprising at least a set of guard symbol values associated with a mobile termination (MT) and a distributed unit (DU), transition from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmit or receive information via the transitioned one or more MT cells or the transitioned one or more DU cells.

Any of the integrated access and backhauling nodes above, wherein MAC CE comprises one or more MT identifications (ID) for the one or more MT cells associated with the MT and one or more DU IDs for the one or more DU cells associated with the DU.

Any of the integrated access and backhauling nodes above, wherein the one or more processors are further configured to receive a radio resource control (RRC) message comprising one or more MT indices identifying the one or more MT cells and one or more DU indices identifying the one or more DU cells, wherein the set of guard symbol values is associated with the one or more MT indices and the one or more DU indices.

Any of the integrated access and backhauling nodes above, wherein the MAC-CE comprises a plurality of bits indicating a plurality of sets of guard symbol values associated with a plurality of pairs of MT cells and DU cells, and receive a radio resource control (RRC) message indicating the association between bit positions of a subset of the plurality of bits associated with the set of guard symbol values and a pair of MT cell and DU cell of the plurality of pairs of MT cells and DU cells, and identify, based on the bit positions, the set of guard symbol values of the plurality of sets of guard symbol values associated with the pair of MT cell and DU cell.

Any of the integrated access and backhauling nodes above, wherein the set of guard symbol values is associated with a second pair of MT cell and DU cell, of the plurality of pairs of MT cells and DU cells, different from the pair of MT cell and DU cell.

Any of the integrated access and backhauling nodes above, wherein the one or more processors are further configured to receive a radio resource control (RRC) message comprising a plurality of indices each associated with a pair of MT cell and DU cell of a plurality of pairs of MT cell and DU cell, and wherein receiving the MAC CE comprises receiving one or more indices, of the plurality of indices, associated with the one or more pairs of MT cells and DU cells.

Any of the integrated access and backhauling nodes above, wherein the set of guard symbol values is associated with an MT cell and a plurality of DU cells.

Any of the integrated access and backhauling nodes above, wherein receiving the MAC CE comprises receiving the MAC CE from a cell associated with a timing advance group, a master cell group, or a secondary cell group, and the set of guard symbol values is associated with the timing advance group, the master cell group, or the secondary cell group.

Any of the integrated access and backhauling nodes above, wherein receiving the MAC CE further comprises receiving a DU group index identifying a DU cell group.

Any of the integrated access and backhauling nodes above, wherein receiving the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

An aspect of the present disclosure includes an integrated access and backhauling node including means for receiving a medium access control (MAC) control element (CE) comprising at least a set of guard symbol values associated with a mobile termination (MT) and a distributed unit (DU), means for transitioning from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and means for transmitting or receiving information via the transitioned one or more MT cells or the transitioned one or more DU cells.

Any of the integrated access and backhauling nodes above, wherein the MAC CE comprises one or more MT identifications (ID) for the one or more MT cells associated with the MT and one or more DU IDs for the one or more DU cells associated with the DU.

Any of the integrated access and backhauling nodes above, further comprising means for receiving a radio resource control (RRC) message comprising one or more MT indices identifying the one or more MT cells and one or more DU indices identifying the one or more DU cells, wherein the set of guard symbol values is associated with the one or more MT indices and the one or more DU indices.

Any of the integrated access and backhauling nodes above, wherein the MAC-CE comprises a plurality of bits indicating a plurality of sets of guard symbol values associated with a plurality of pairs of MT cells and DU cells, and further comprising means for receiving a radio resource control (RRC) message indicating the association between bit positions of a subset of the plurality of bits associated with the set of guard symbol values and a pair of MT cell and DU cell of the plurality of pairs of MT cells and DU cells, and means for identifying, based on the bit positions, the set of guard symbol values of the plurality of sets of guard symbol values associated with the pair of MT cell and DU cell.

Any of the integrated access and backhauling nodes above, wherein the set of guard symbol values is associated with a second pair of MT cell and DU cell, of the plurality of pairs of MT cells and DU cells, different from the pair of MT cell and DU cell.

Any of the integrated access and backhauling nodes above, further comprising means for receiving a radio resource control (RRC) message comprising a plurality of indices each associated with a pair of MT cell and DU cell of a plurality of pairs of MT cell and DU cell, and wherein receiving the MAC CE comprises receiving one or more indices, of the plurality of indices, associated with the one or more pairs of MT cells and DU cells.

Any of the integrated access and backhauling nodes above, wherein the set of guard symbol values is associated with an MT cell and a plurality of DU cells.

Any of the integrated access and backhauling nodes above, wherein means for receiving the MAC CE comprises means for receiving the MAC CE from a cell associated with a timing advance group, a master cell group, or a secondary cell group, and the set of guard symbol values is associated with the timing advance group, the master cell group, or the secondary cell group.

Any of the integrated access and backhauling nodes above, wherein means for receiving the MAC CE further comprises means for receiving a DU group index identifying a DU cell group.

Any of the integrated access and backhauling nodes above, wherein means for receiving the MAC CE comprises means for receiving a flag indicating whether the set of guard symbol values is associated with a pair of MT cell and DU cell of a plurality of pairs of MT cells and DU cells or one of a MT cell group, a timing advance group, or a DU cell group.

Some aspects of the present disclosure include a non-transitory computer readable medium having instructions stored therein that, when executed by one or more processors of an integrated access and backhauling node, cause the one or more processors to receive a medium access control (MAC) control element (CE) comprising at least a set of guard symbol values associated with a mobile termination (MT) and a distributed unit (DU), transition from first communication via one or more MT cells associated with the MT to second communication via one or more DU cells associated with the DU or from the second communication via the one or more DU cells associated with the DU to the first communication via the one or more MT cells associated with the MT during at least a guard symbol signaled by a guard symbol value of the set of guard symbol values, and transmit or receive information via the transitioned one or more MT cells or the transitioned one or more DU cells.

Any of the non-transitory computer readable media above, wherein MAC CE comprises one or more MT identifications (ID) for the one or more MT cells associated with the MT and one or more DU IDs for the one or more DU cells associated with the DU.

Any of the non-transitory computer readable media above, further comprising instructions, when executed by the one or more processors, cause the one or more processors to receive a radio resource control (RRC) message comprising one or more MT indices identifying the one or more MT cells and one or more DU indices identifying the one or more DU cells, wherein the set of guard symbol values is associated with the one or more MT indices and the one or more DU indices.

Any of the non-transitory computer readable media above, wherein the MAC-CE comprises a plurality of bits indicating a plurality of sets of guard symbol values associated with a plurality of pairs of MT cells and DU cells, and further comprising instructions, when executed by the one or more processors, cause the one or more processors to receive a radio resource control (RRC) message indicating the association between bit positions of a subset of the plurality of bits associated with the set of guard symbol values and a pair of MT cell and DU cell of the plurality of pairs of MT cells and DU cells, and identify, based on the bit positions, the set of guard symbol values of the plurality of sets of guard symbol values associated with the pair of MT cell and DU cell.

Any of the non-transitory computer readable media above, wherein the set of guard symbol values is associated with a second pair of MT cell and DU cell, of the plurality of pairs of MT cells and DU cells, different from the pair of MT cell and DU cell.

Any of the non-transitory computer readable media above, further comprising instructions, when executed by the one or more processors, cause the one or more processors to receive a radio resource control (RRC) message comprising a plurality of indices each associated with a pair of MT cell and DU cell of a plurality of pairs of MT cell and DU cell, and wherein receiving the MAC CE comprises receiving one or more indices, of the plurality of indices, associated with the one or more pairs of MT cells and DU cells.

Any of the non-transitory computer readable media above, wherein the set of guard symbol values is associated with an MT cell and a plurality of DU cells.

Any of the non-transitory computer readable media above, wherein the instructions for receiving the MAC CE comprises instructions, when executed by the one or more processors, cause the one or more processors to receive the MAC CE from a cell associated with a timing advance group, a master cell group, or a secondary cell group, and the set of guard symbol values is associated with the timing advance group, the master cell group, or the secondary cell group.

Any of the non-transitory computer readable media above, wherein the instructions for receiving further comprising instructions, when executed by the one or more processors, cause the one or more processors to receive the MAC CE further comprises receiving a DU group index identifying a DU cell group.

Any of the non-transitory computer readable media above, wherein the instructions for receiving further comprising instructions, when executed by the one or more processors, cause the one or more processors to receive the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by an integrated access and backhauling node in a network, comprising:
   receiving a medium access control (MAC) control element (CE) indicating one or more sets of guard symbol values associated with a mobile termination (MT) and a distributed unit (DU);
   receiving a radio resource control (RRC) message indicating association of each set of the one or more sets of guard symbol values with a corresponding MT cell or a corresponding DU cell or both, wherein the corresponding MT cell is among one or more MT cells associated with the MT and the corresponding DU cell is among one or more DU cells associated with the DU;
   identifying, for an MT cell and a DU cell, a set of guard symbol values from the one or more sets of guard symbol values, based on the association indicated by the RRC message;
   transitioning from first communication via the MT cell to second communication via the DU cell or from the second communication via the DU cell to the first communication via the MT cell during at least a guard symbol signaled by a guard symbol value of the set of guard symbol values; and
   transmitting or receiving information via the transitioned MT cell or the transitioned DU cell.

2. The method of claim 1, wherein:
   the MAC CE comprises one or more MT identifications (ID) for the one or more MT cells associated with the MT and one or more DU IDs for the one or more DU cells associated with the DU.

3. The method of claim 1,
   wherein the radio resource control (RRC) message comprises one or more MT indices identifying the one or more MT cells and one or more DU indices identifying the one or more DU cells, and wherein the one or more sets of guard symbol values are associated with the one or more MT indices and the one or more DU indices.

4. The method of claim 1, wherein:
   the MAC-CE comprises a plurality of bits indicating the one or more sets of guard symbol values associated with a plurality of pairs of MT cells and DU cells; and
   the radio resource control (RRC) message indicates association between bit positions of a subset of the plurality of bits indicating a set of guard symbol values and a corresponding pair of MT cell and DU cell of the plurality of pairs of MT cells and DU cells.

5. The method of claim 4, wherein:
   the set of guard symbol values is associated with a second pair of MT cell and DU cell, of the plurality of pairs of MT cells and DU cells, different from the pair of MT cell and DU cell.

6. The method of claim 1,
   wherein the radio resource control (RRC) message comprises a plurality of indices each associated with a pair of MT cell and DU cell of a plurality of pairs of MT cell and DU cell; and
   wherein receiving the MAC CE comprises receiving one or more indices, of the plurality of indices, associated with the one or more pairs of MT cells and DU cells.

7. The method of claim 1, wherein:
   the set of guard symbol values is associated with the MT cell and a plurality of DU cells.

8. The method of claim 1, wherein:
receiving the MAC CE comprises receiving the MAC CE from a cell associated with a timing advance group, a master cell group, or a secondary cell group; and
the set of guard symbol values is associated with the timing advance group, the master cell group, or the secondary cell group.

9. The method of claim 1, wherein:
receiving the MAC CE further comprises receiving a DU group index identifying a DU cell group.

10. The method of claim 1, wherein:
receiving the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

11. A integrated access and backhauling node, comprising:
a memory comprising instructions;
a transceiver; and
one or more processors coupled with the memory and the transceiver, the one or more processors configured to execute instructions in the memory to:
receive a medium access control (MAC) control element (CE) indicating one or more sets of guard symbol values associated with a mobile termination (MT) and a distributed unit (DU);
receive a radio resource control (RRC) message indicating association of each set of the one or more sets of guard symbol values with a corresponding MT cell or a corresponding DU cell or both, wherein the corresponding MT cell is among one or more MT cells associated with the MT and the corresponding DU cell is among one or more DU cells associated with the DU;
identify, for an MT cell and a DU cell, a set of guard symbol values from the one or more sets of guard symbol values, based on the association indicated by the RRC message;
transition from first communication via the MT cell to second communication via the DU cell or from the second communication via the DU cell to the first communication via the MT cell during at least a guard symbol signaled by a guard symbol value of the set of guard symbol values; and
transmit or receive information via the transitioned MT cell or the transitioned DU cell.

12. The integrated access and backhauling node of claim 11, wherein:
the MAC CE comprises one or more MT identifications (ID) for the one or more MT cells associated with the MT and one or more DU IDs for the one or more DU cells associated with the DU.

13. The integrated access and backhauling node of claim 11, wherein the radio resource control (RRC) message comprises one or more MT indices identifying the one or more MT cells and one or more DU indices identifying the one or more DU cells, and wherein the one or more sets of guard symbol values are associated with the one or more MT indices and the one or more DU indices.

14. The integrated access and backhauling node of claim 11, wherein:
the MAC-CE comprises a plurality of bits indicating the one or more sets of guard symbol values associated with a plurality of pairs of MT cells and DU cells; and
the radio resource control (RRC) message indicates association between bit positions of a subset of the plurality of bits indicating a set of guard symbol values and a corresponding pair of MT cell and DU cell of the plurality of pairs of MT cells and DU cells.

15. The integrated access and backhauling node of claim 14, wherein:
the set of guard symbol values is associated with a second pair of MT cell and DU cell, of the plurality of pairs of MT cells and DU cells, different from the pair of MT cell and DU cell.

16. The integrated access and backhauling node of claim 11, wherein the radio resource control (RRC) message comprises a plurality of indices each associated with a pair of MT cell and DU cell of a plurality of pairs of MT cell and DU cell; and
wherein receiving the MAC CE comprises receiving one or more indices, of the plurality of indices, associated with the one or more pairs of MT cells and DU cells.

17. The integrated access and backhauling node of claim 11, wherein:
the set of guard symbol values is associated with the MT cell and a plurality of DU cells.

18. The integrated access and backhauling node of claim 11, wherein:
receiving the MAC CE comprises receiving the MAC CE from a cell associated with a timing advance group, a master cell group, or a secondary cell group; and
the set of guard symbol values is associated with the timing advance group, the master cell group, or the secondary cell group.

19. The integrated access and backhauling node of claim 11, wherein:
receiving the MAC CE further comprises receiving a DU group index identifying a DU cell group.

20. The integrated access and backhauling node of claim 11, wherein:
receiving the MAC CE comprises receiving a flag indicating whether the set of guard symbol values is associated with a pair of MT cell and DU cell of a plurality of pairs of MT cells and DU cells or one of a MT cell group, a timing advance group, or a DU cell group.

21. A non-transitory computer readable medium having instructions stored therein that, when executed by one or more processors of an integrated access and backhauling node, cause the one or more processors to:
receive a medium access control (MAC) control element (CE) of indicating one or more sets guard symbol values associated with a mobile termination (MT) and a distributed unit (DU);
receive a radio resource control (RRC) message indicating association of each set of the one or more sets of guard symbol values with a corresponding MT cell or a corresponding DU cell or both, wherein the corresponding MT cell is among one or more MT cells associated with the MT and the corresponding DU cell is among one or more DU cells associated with the DU;
identify, for an MT cell and a DU cell, a set of guard symbol values from the one or more sets of guard symbol values, based on the association indicated by the RRC message;
transition from first communication via the MT cell to second communication via the DU cell or from the second communication via the DU cell to the first communication via the MT cell during at least a guard symbol signaled by a guard symbol value of the set of guard symbol values; and transmit or receive information via the transitioned MT cell or the transitioned DU cell.

22. The non-transitory computer readable medium of claim 21, wherein:
the MAC CE comprises one or more MT identifications (ID) for the one or more MT cells associated with the MT and one or more DU IDs for the one or more DU cells associated with the DU.

23. The non-transitory computer readable medium of claim 21,
wherein the radio resource control (RRC) message comprises one or more MT indices identifying the one or more MT cells and one or more DU indices identifying the one or more DU cells, and wherein the one or more sets of guard symbol values are associated with the one or more MT indices and the one or more DU indices.

24. The non-transitory computer readable medium of claim 21, wherein:
the MAC-CE comprises a plurality of bits indicating the one or more sets of guard symbol values associated with a plurality of pairs of MT cells and DU cells; and
the radio resource control (RRC) message indicates association between bit positions of a subset of the plurality of bits indicating a set of guard symbol values and a corresponding pair of MT cell and DU cell of the plurality of pairs of MT cells and DU cells.

25. The non-transitory computer readable medium of claim 24, wherein:
the set of guard symbol values is associated with a second pair of MT cell and DU cell, of the plurality of pairs of MT cells and DU cells, different from the pair of MT cell and DU cell.

26. The non-transitory computer readable medium of claim 21,
wherein the radio resource control (RRC) message comprises a plurality of indices each associated with a pair of MT cell and DU cell of a plurality of pairs of MT cell and DU cell; and
wherein receiving the MAC CE comprises receiving one or more indices, of the plurality of indices, associated with the one or more pairs of MT cells and DU cells.

27. The non-transitory computer readable medium of claim 21, wherein:
the set of guard symbol values is associated with the MT cell and a plurality of DU cells.

28. The non-transitory computer readable medium of claim 21, wherein:
the instructions for receiving the MAC CE comprises instructions, when executed by the one or more processors, cause the one or more processors to receive the MAC CE from a cell associated with a timing advance group, a master cell group, or a secondary cell group; and
the set of guard symbol values is associated with the timing advance group, the master cell group, or the secondary cell group.

29. The non-transitory computer readable medium of claim 21, wherein the instructions for receiving the MAC CE further comprising instructions, when executed by the one or more processors, cause the one or more processors to:
receive a DU group index identifying a DU cell group.

30. The non-transitory computer readable medium of claim 21, wherein the instructions for receiving the MAC CE further comprising instructions, when executed by the one or more processors, cause the one or more processors to:
receive a flag indicating whether the set of guard symbol values is associated with a pair of MT cell and DU cell of a plurality of pairs of MT cells and DU cells or one of a MT cell group, a timing advance group, or a DU cell group.

* * * * *